United States Patent [19]
Kondo et al.

[11] Patent Number: 4,741,223
[45] Date of Patent: May 3, 1988

[54] STEERING WHEEL

[75] Inventors: Katsumi Kondo; Yasuhiro Tsutiya; Yasushi Yamazawa, all of Toyota; Takatsune Niimi, Aichi; Takashi Yamamoto, Ichinomiya, all of Japan

[73] Assignee: Toyota Jidosha Kabushiki Kaisha, Toyota, Japan

[21] Appl. No.: 685,737

[22] Filed: Dec. 24, 1984

[30] Foreign Application Priority Data

Dec. 25, 1983 [JP] Japan ............................ 58-205129[U]

[51] Int. Cl.$^4$ ................................................. B62D 1/04
[52] U.S. Cl. ........................................ 74/552; 156/172
[58] Field of Search .................. 74/552, 558; 156/166, 156/169, 172, 173, 245, 425, 441, 443; 264/103, 137

[56] References Cited

U.S. PATENT DOCUMENTS

| 1,680,646 | 8/1928 | Smith | 74/552 |
| 2,409,645 | 10/1946 | Sawyer | 74/552 |
| 3,738,885 | 6/1973 | Lecomte | 74/552 |
| 4,419,908 | 12/1983 | Reikowski | 264/137 |
| 4,440,593 | 4/1984 | Goldsworthy | 156/441 |
| 4,483,214 | 11/1984 | Mayer | 264/103 |

FOREIGN PATENT DOCUMENTS

| 0063572 | 4/1983 | Japan | 74/552 |
| 964099 | 7/1964 | United Kingdom | 156/173 |
| 2004835 | 4/1979 | United Kingdom | . |
| 2041858 | 9/1980 | United Kingdom | 74/552 |

Primary Examiner—Gerald A. Michalsky
Attorney, Agent, or Firm—Oblon, Fisher, Spivak, McClelland & Maier

[57] ABSTRACT

A steering wheel made of resin, wherein a reinforcement, as a core of the steering wheel, consists of reinforcing members corresponding to a ring part, a sub-ring part and spoke parts, which are formed of windings and by hardening of a strand of continuously long fiber impregnated with a resin for hardening, after being wound onto the ring part, the sub-ring part and the spoke parts via a boss and spacers which are disposed at the joints between the ring part, the sub-ring part and the spoke parts.

10 Claims, 2 Drawing Sheets

STEERING WHEEL

BACKGROUND OF THE INVENTION

1. Field of the Invention

This invention relates to a steering wheel for use in automobiles and other vehicles. More particularly, this invention relates to a steering wheel using fiber reinforced plastic (FRP) consisting of continuously long fibers as its reinforcing member.

2. Description of the Prior Art

Recent trends of automotive vehicles toward general reduction of weight has been encouraging use of increasing amounts of resins in automobile parts. Steering wheels are no exception. Resins of polyurethane, polypropylene, and other similar types have been adopted as materials for steering wheels. Since these resins have low strength, however, they have been invariably required to incorporate metallic reinforcement. Generally, round bars and pipes of iron are used as the metallic reinforcement. The weight of metallic reinforcement normally accounts for as much as about 40% of the entire weight of the steering wheel. The use of the metallic reinforcement, therefore, contradicts the inclination toward reduction of weight and proves disadvantageous.

FIG. 7 illustrates a typical conventional reinforcement of a steering wheel formed of round bars and round pipes. This reinforcement includes a core around which resins are molded for forming a steering wheel. The reinforcement of this steering wheel comprises reinforcing members 10, 11, and 12 respectively positioned in the corresponding parts of a ring, a sub-ring, and spokes of a steering wheel (hereinafter called as a ring part, a sub-ring part and spoke parts respectively). The reinforcing members 12 of the spoke parts and the reinforcing member 11 of the sub-ring part are formed of round bars ofiron. These reinforcing members 11, 12 are integrally bound by being welded at the outer edges of the reinforcing members 12. The inner ends of the reinforcing members 12 are fastened by welding to a boss plate 13a of iron plate supporting a boss 13 thereon.

The reinforcing member 10 of the ring part is formed of a pipe. Into the opposite ends of the reinforcing member 10 so formed of a pipe, the bent outer ends of the reinforcing members 12 of the spoke parts are inserted. The reinforcing member 10 and the reinforcing members 12 are joined by being welded where the latter are inserted into the former.

In the conventional reinforcement of a steering wheel illustrated in FIG. 7, the reinforcing member 10 of the ring part is formed of a pipe for the purpose of weight reduction. Since this pipe is made of iron, the overall weight is about 0.8 kg in the steering wheel of an ordinary automobile. This reinforcing member is rather heavy.

Since these reinforcing members 10, 11, and 12 are formed of round bars or round pipes of iron, the joints of these reinforcing members 10, 11, and 12 are inevitably welded one by one. Thus, the conventional reinforcement of a steering wheel has also proved disadvantageous from the standpoint of manufacture.

In addition, to permit this welding, the portions of the reinforcing members to be welded are not allowed to have a small wall thickness. the boss plate 13a as used generally at present has a wall thickness of about 2 mm. This fact constitutes one of the factors for the increase of weight.

The reduction of weight of the steering wheel brings about a desirable effect upon the prevention of vibrations which are transmitted through the steering system to the automobile driver during the travel of the automobile. Specifically, the magnitude of such vibrations is decreased in proportion as the weight of steering wheel is reduced. Thus, a further reduction of the weight of the steering wheel is still in demand.

Further recently, as described in the British Patent Publication No. 2004835A, a long fiber reinforced plastic formed of continuous beam, which are formed of a continuously long fiber strand of carbon fiber or glass fiber impregnated with resin such as epoxy resin, has been developed and known to be used in the formation of some lattice structures, where such a fiber reinforced plastic is wound onto a frame work forming a structure of a shape.

However, there has been a drawback in this engineering that, if there is contained in the structure any T-letter or Y-letter figured branch, the binding strength of the branch may not be strong enough to prevent the strands being released or broken by some outer force. Accordingly since the reinforcement of a steering wheel in this invention of the present appliction, which is intended to apply such a structure as described above, has a T-letter branch, there arises a similar drawback to the one of British Pat. No. 2004835A.

SUMMARY OF THE INVENTION

This invention has been created for the purpose of overcoming the drawbacks suffered by the prior art as described above. An object of this invention is to provide a steering wheel which uses fiber reinforced plastic using a continuously long fiber in the place of metal such as iron as reinforcement for a steering wheel made of resin and, consequently, possesses strength equal to or superior to the strength of the steering wheel reinforced with a metal and enjoys a notable reduction of weight.

Another object of this invention is to provide a method for the manufacture of the aforementioned steering wheel by a using fiber reinforced plastic using continuously long fiber as a reinforcment to a steering wheel made of resin.

To accomplish the objects described above in the steering wheel of the present invention, spacers are interposed one each between the ring part, the sub-ring part, and the spoke part and continuously wound via the spacers around the ring part, the sub-ring part, and the spoke parts so that the joints between those parts are integrally bound by the aid of the spacers with the fiber reinforced plastic.

Since this invention is constructed as described above, the strong reinforcement can be obtained and as a result, the steering wheel can be produced in a reduced weight and the reduction of weight results in a decrease in the vibrations caused in the steering system during the drive. Further, since the FRP consisting of continuous fibers has a better vibration property than iron, the FRP itself contributes to the absorption of the vibrations. In the process of manufacture, this reinforcement does not need binding means such as welding which is indispensable to the conventional reinforcement formed of iron and, therefore, enjoys simplification of process. Also in terms of th strength of reinforcement, since the number of windings of the continuously long fiber strand of the FRP on the ring part, the sub-ring part, and the spoke parts can be adjusted, the optimum strength required at any portion of the steering wheel can be freely controlled.

Further, since the spacers, cylindrical in shape, are disposed at the joint of the ring part, the sub-ring part and spoke parts, and the winding direction of the continuously long fiber to be wound around those parts is turned via the spacers, the joint causes no sharp binding of the fibers and far from that the fiber-strand to be wound intersects with each other on the spacer while being wound severalfold, so that the reinforcement, when it is hardened integrally with spacers by a resin, becomes quite strong.

The other objects and effects of this invntion will become apparent from the description given in further detail hereinbelow with reference to the accompanying drawings.

DESCRIPTION OF THE PREFERRED EMBODIMENT

As a fiber reinforced plastic to be used in this invention, many can be mentioned, however what is exemplified hereinafter is a continuously long fiber strand which is formed of a plurality of glass fibers roved. And as a resin to impregnate the fiber strand, epoxy resin is used.

Figure 1:
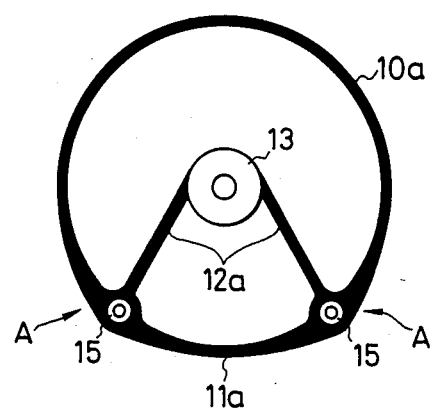
FIG. 1 is a plan view of a steering wheel of the present invention.

With reference to FIG. 1, reinforcing members 10a, 11a, and 12a respectively of a ring part, a sub-ring part, and spoke parts are formed by winding continuous glass fiber strand of FRP impregnated with a resin in predescribed numbers of turns. Even a boss 13 made of iron and disposed at the center of the wheel is bound together by being wound with continuous glass fibers of FRP. Cylindrical spacers 15 are disposed at each joint A between the reinforcing member 10a of the ring part, the reinforcing member 11a of the sub-ring part, and the reinforcing member 12a of the spoke parts. The aforementioned continuous glass fiber strand of FRP is also wound on the peripheries of these spacers 15 to permit integral formation of the reinforcing members 10a, 11a, and 12a respectively of the ring part, the sub-ring part, and the spoke parts.

Now, the method by which the reinforcing members 10a, 11a, and 12a constructed as described above are manufactured will be described below.

Figure 2:
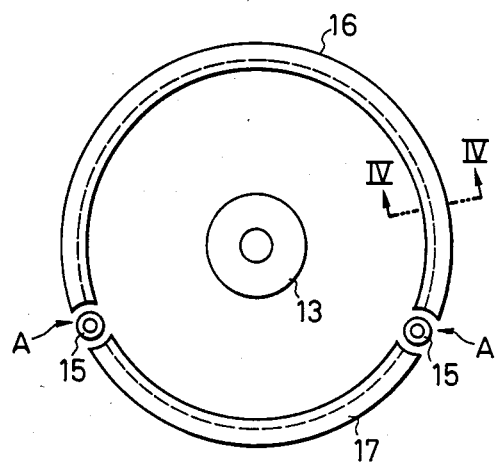
FIG. 2 is a diagram illustrating the construction of a jig for aiding in manufacturing reinforcement of a steering wheel according to this invention.
Figure 3:
FIG. 3 is a cross section taken along the line IV—IV in the diagram of FIG. 2.

First, as illustrated in FIG. 2, a boss 13 made of iron is disposed at the center and, at the same time, two cylindrical spacers 15 are disposed one each at the joints A between the ring part the sub-ring part and the spoke parts, and then jigs 16, 17 are disposed at the positions of the ring part and the sub-ring part. The jigs 16, 17 are disposed as indicated for the purpose of aiding in formation of the reinforcing members 10a and 11a of the ring part and the sub-ring part. These jigs have a semicircular cross section as illustrated in FIG. 3 so as to permit formation of reinforcing members 10a and 11a.

Figure 4:
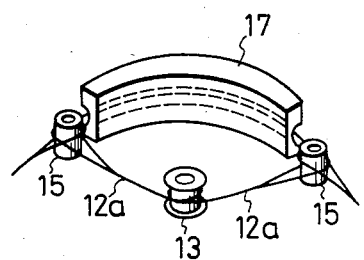
FIG. 4 is a perspective view illustrating the manner in which fiber reinforced plastic is wound on the jig.

In the condition of arrangement illustrated in FIG. 2, a strand of continuous glass fiber impregnated with resin as the material for FRP is directly wound on the boss 13 as illustrated in FIG. 4 to effect binding of the continuous glass fibers to the boss 13. Then, the continuous glass fibers are wound on the spacers 15 and subsequently, with the spacers serving as direction-changing bridges, wound on the jigs 16 and 17. By performing the procedure mentioned above, optionally by repeating this procedure time and again, the reinforcing members 10a, 11a, and 12a respectively of the ring part, the sub-ring part, and the spoke part are formed of the FRP of continuous glass fibers.

The jigs 16 and 17 so used are removed after the resin impregnating the continuous glass fibers is hardened.

In the embodiment described above, a strand of continuously long fiber of glass impregnated with epoxy resin is exemplified, more preferably a strand of carbon fiber, having a property of high strength and elasticity, may cause a greater reduction of weight than the glass fiber. In addition, polyaromatic amid fiber also may be used. Further, a mixture of those may preferably be used together.

The diameter of the glass fiber roved is not specifically limited a preferable dimension is, in the case of glass fiber, 8 to 20 microns, and in the case of carbon fiber, 7 to 15 microns. As the other resins for impregnating the continuous glass fibers, rather than epoxy resin, there can be used, unsaturated polyester resin, or phenol resin, for example.

Further in the preferred embodiment described above, the number of windings of a strand of the continuous glass fibrs on the ring part, the sub-ring part, and the spoke parts can be independantly varied, depending partly on the disposition of the boss 13 and the spacers 15, so as to give rise to reinforcing members 10a, 11a, and 12a of respectively required magnitudes of strength.

In the embodiment described above, when the spacers 15 are provided at the cores thereof with holes, these holes can be utilized as positioning holes during the formation of a surface pad of urethane resin on the reinforcement which is generally carried out by injection molding. The urethane resin which is inserted into the holes during the injection molding serves to reinforce the spacers 15.

In the embodiment described above, since continuous glass fibers are bound to the boss 13 by being wound on the periphery thereof, the boss 13 and the reinforcing members 12a on the spoke parts can be joined without requiring use of any adhesive agent.

Further as the material of the boss, it can be resin, FRP, aluminum, aluminum alloy, magnesium, magnesium alloy or steel.

This invention has been described with reference to a specific embodiment illustrated in the drawings. This invention is not limited to this particular embodiment but may be embodied in various ways within the scope of the spirit of the invention.

Figure 5:
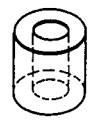
FIG. 5 is a perspective view illustrating a cylindrical spacer.
Figure 6:
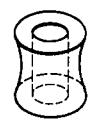
FIG. 6 is a perspective view illustrating a hand-drum type of spacer.
Figure 7:
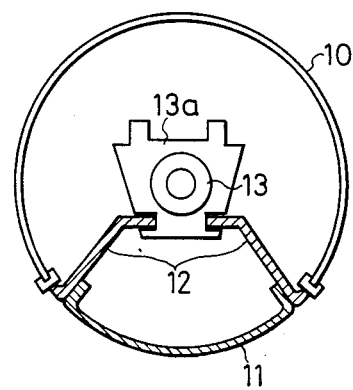
FIG. 7 is a plan view of a conventional reinforcement of a steering wheel using metallic materials.

For example, this invention has no reason to limit the shape of the spacers to the cylindrical ones 15 as involved in the embodiment described above and exemplified in FIG. 5, and also it can be a hand drum type as illustrated in FIG. 6. Further, optionally, the spacers 15 may be formed of aluminum alloy or resin, a material featuring light weight. Use of these spacers contributes more to the reduction of weight.

What we claim is:

1. A method for the manufacture of a steering wheel having a reinforcement consisting of a fiber reinforced plastic, comprising the steps of:
   disposing a boss at a center of a jig,
   disposing spacers at joint between a ring part, a sub-ring part and spoke parts of the jig,
   impregnating a strand of continuously long fiber with a resin,
   fastening one end of the strand of fiber impregnated with the resin to the boss,
   integrating the boss, spacers and fiber by winding the strand of fiber via the spacers and the boss on the jigs of the ring part, the sub-ring part and spoke parts,
   hardening the resin, and
   removing the jigs after the hardening.

2. A steering wheel comprising:
   a boss;
   at least one spacer; and
   a reinforcement formed of hardened windings of a continuous strand of long fiber impregnated with a hardenable resin, said reinforcement defining a ring part, a sub-ring part and at least one spoke part, said boss being being integrally formed with each said spoke part at one end of said spoke part, and each said spacer being integrally formed with said reinforcement at a joint between one said spoke part, said ring part and said sub-ring part.

3. A steering wheel according to claim 2, wherein said boss is made of one from the group consisting of resin and fiber reinforced plastic.

4. A steering wheel according to claim 2, wherein said boss is made of one from the group consisting of aluminum, aluminum alloy, magnesium, magnesium alloy and steel.

5. A steering wheel according to claim 2, wherein said continuous fiber is made from one from the group consisting of glass fiber, carbon fiber, polyaromatic amid fiber and a mixture thereof.

6. A steering wheel according to claim 2, wherein said fiber is continuous glass fiber.

7. A steering wheel according to claim 2, wherein said at least one spacer has a shape of one of a cylinder and a hand drum.

8. The steering wheel of claim 2 wherein said fiber winds around said boss and said at least one spacer to integrate said boss with each said spoke part and to integrate each said spacer with a respective said reinforcement joint.

9. The steering wheel of claim 8 including at least two of said spoke parts and at least two of said spacers.

10. The steering wheel of claim 2 including at least two of said spoke parts and at least two of said spacers.

* * * * *